United States Patent [19]

Sauer

[11] 4,244,088
[45] Jan. 13, 1981

[54] HOSE CLIP

[75] Inventor: Heinz Sauer, Ronneburg, Fed. Rep. of Germany

[73] Assignee: Rasmussen GmbH, Maintal, Fed. Rep. of Germany

[21] Appl. No.: 103,289

[22] Filed: Dec. 13, 1979

[30] Foreign Application Priority Data

Dec. 18, 1978 [DE] Fed. Rep. of Germany ....... 2854676

[51] Int. Cl.³ ............................................. B65D 63/00
[52] U.S. Cl. ................................... 24/274 R; 411/396
[58] Field of Search ...................... 24/274 R, 279, 283, 24/274 P; 85/9 R

[56] References Cited

U.S. PATENT DOCUMENTS

| 1,820,556 | 8/1931 | Campbell et al. | 85/9 R |
| 1,827,628 | 10/1931 | Twedell | 85/9 R |
| 3,162,921 | 12/1964 | Cheris | 24/274 R |
| 3,950,830 | 4/1976 | Duprez | 24/274 R |

FOREIGN PATENT DOCUMENTS

| 933013 | 4/1948 | France | 24/274 R |
| 84648 | 3/1952 | Norway | 24/274 R |
| 574101 | 12/1945 | United Kingdom | 24/274 R |
| 664855 | 1/1952 | United Kingdom | 24/274 R |
| 667211 | 2/1952 | United Kingdom | 24/274 R |
| 724106 | 2/1955 | United Kingdom | 24/274 R |

Primary Examiner—Roy D. Frazier
Assistant Examiner—Peter A. Aschenbrenner
Attorney, Agent, or Firm—Peter K. Kontler

[57] ABSTRACT

A hose clip wherein the housing is made of an originally flat sheet metal blank and has a tubular section for the shank of a rotary screw mating with one end portion of a band whose end portions extend through the tubular section between the thread on the shank and a flat bottom wall of the tubular section. The head of the screw has a tubular portion which surrounds one end portion of the tubular section so as to hold such end portion against radial and/or axial movement relative to the screw whereby the head cannot penetrate into and cannot expand the tubular section while it rotates in a direction to tension the band around the end portion of a hose or an analogous structure. The tubular portion may be integral with the remaining portion of the head, it can be bonded to such remaining portion or it may be rotatably mounted on the shank adjacent to the remaining portion of the head. Since the head cannot penetrate into the housing and the screw cannot pivot with reference to the housing, the shank of the screw can apply to the band a very pronounced tensional stress to tighten the looped intermediate portion of the band around a hose or the like. An extension of the housing which is disposed substantially radially or tangentially of the shank is provided to prevent tilting of the housing as a result of rotation of the tubular section with the shank when the screw is rotated in a direction to tension the band. Teeth between two neighboring surfaces of the tubular section and the head reduce the likelihood of excessive tensioning of the band in that the teeth oppose continuous rotation of the shank by causing the head to ratchet with respect to the adjacent end portion of the tubular section. The teeth can also prevent or oppose rotation of the screw in a direction to reduce the tensional stress upon the band.

43 Claims, 19 Drawing Figures

HOSE CLIP

BACKGROUND OF THE INVENTION

The present invention relates to clamps or clips for hoses, pipes or like structures. More particularly, the invention relates to clamps or clips (hereinafter called clips or hose clips) of the type wherein a housing receives the end portions of a band which is trained or looped around a hose or a like structure. The housing rotatably supports a tensioning element in the form of a screw having a shank whose thread mates with the thread on one end portion of the band. The head of the screw is adjacent to one axial end of a tubular section forming part of or constituting the housing. Still more particularly, the invention relates to improvements in hose clips of the type having means for holding one end portion of the tubular section against radial movement relative to the shank and such holding means extends in the axial direction of the screw.

It is already known to provide a hose clip with a tensioning screw (hereinafter called screw for short) whose head has a cylindrical, conical or polygonal outline. The head and the shank of the screw define a shoulder which abuts against one end face of the tubular section of the housing wherein the shank rotates. As a rule, the tubular section of the housing resembles a tunnel including a substantially semicylindrical part which is remote from the end portions of the band and surrounds one half of the externally threaded shank, and a substantially U-shaped part which confines the two overlapping end portions of the band, so that the externally threaded end portion of the band can mate with the thread on the shank. Parts of end portions of the tubular section are recessed in order to allow for convenient insertion of the end portions of the band. The recesses are normally provided in the U-shaped part of the tubular section, i.e., the U-shaped part is shorter than the semicylindrical part as a result of the provision of recesses in the end portions of the tubular section. That end portion of the band which is not provided with external threads is adjacent to a normally flat or substantially flat bottom wall of the tubular section, and the threaded end portion of the band extends between the unthreaded end portion of the band and the shank of the tensioning screw. When the screw is rotated in a direction to tension the band, i.e., to increase the tensional stress upon the looped median portion of the band by way of the threaded end portion, the force which the thread of the shank transmits to the band acts in substantial parallelism with the axis of the shank and such force is applied in the region of those portions of threads on the threaded end portion of the band and on the shank which are in mesh with each other. The just mentioned force tends to pivot the screw about an axis which is normal to the central symmetry plane of the band and includes the axis of the shank. In other words, the screw tends to pivot about the axis of a hose or an analogous structure which is surrounded by the looped median portion of the band while the latter is subjected to a gradually increasing tensional stress as a result of clockwise rotation of the shank with reference to the tubular section of the housing. The just mentioned pivoting of the screw results in a movement of the head of the screw closer to the bottom wall of the housing while the free end or tip of the shank approaches the topmost portion of the tubular section, namely, that portion of the semicylindrical part of the tubular section which is remotest from the bottom wall. Owing to the provision of recesses at the ends of the U-shaped part of the tubular section, the head of the screw cannot contact and bear against the bottom wall and, as a result of such absence of contact, the head is likely to penetrate into the respective end portion of the tubular section of the housing whereby the tubular section expands or bursts open to terminate the engagement between the shank and the threaded end portion of the band. This can result in spillage of the fluid which is conveyed in a hose, pipe or nipple, and the thus damaged or destroyed clip must be replaced with a fresh clip.

Proposals to reduce the likelihood of expansion of the housing for a tensioning screw which is used in a hose clip are disclosed in British Pat. No. 664,855 to Jamie and in French Pat. No. 933,013 to Robinson. The patented hose clips employ screws with cylindrical heads and such hose clips further comprise inserts which are made of sheet metal and have circular openings for the shanks of the screws. The inserts are mounted on the housing, and their openings are immediately adjacent to the heads of the respective screws. Each insert has a cylindrical portion which surrounds a part of the respective end portion of the housing. The cylindrical portion is not a complete cylinder because it is interrupted at that side which is adjacent to the bottom wall, i.e., in the proximity of the two overlapping end portions of the band. In fact, the underside of the cylindrical portion of the insert is parallel to the adjacent exposed side of one (threaded) end portion of the band so that the latter can be readily threaded through the housing. Those parts of the cylindrical portion of the insert which are adjacent to the bottom wall of the housing are parallel to each other and are outwardly adjacent to two flat side walls of the housing.

The just described patented hose clips are less likely to permit tilting of the screw with reference to the end portions of the band, i.e., they are less likely to permit a pivotal or orbital movement of the screw about the axis of the structure which is surrounded by the looped median portion of the band. However, the rotating screw transmits to the insert a substantial torque which tends to rotate the insert in a clockwise direction (if the thread on the shank of the screw is a right-hand thread). Such torque is generated in part as a result of frictional engagement between the surface surrounding the opening in the insert and the external surface of the shank, and in part as a result of engagement between the thread of the shank and the thread on one end portion of the band. The torque is opposed by the side walls of the housing; however, such opposition is relatively small because the side walls are likely to undergo deformation as soon as the tensional stress upon the band reaches a relatively low threshold value. The cylindrical portion of the insert is separated from the housing in response to deformation of the side walls so that the insert is incapable of preventing a pivotal or tilting movement of the screw and the attendant additional deformation or total destruction of the housing. Moreover, in order to furnish a reasonable resistance to deformation and to adequately support the part-cylindrical portion of the insert, the side walls of the housing which is disclosed by the British or French patent must be relatively long. This, in turn, necessitates the provision of a relatively long bottom wall so that the threading of the externally threaded end portion of the band through the housing presents serious problems. Moreover, a relatively long bottom wall cannot adequately conform to the curvature of the structure which is surrounded by the band, especially if such curvature is not constant, i.e., if one and the same type of clip is to be used in connection with hoses or analogous structures having relatively large or relatively small diameters. If the curvature of the bottom wall of the housing deviates from the curvature of the adjacent portion of the structure within the looped median portion of the band, the distribution of tensional stresses upon longitudinally spaced portions of the band is not uniform which can cause leakage between a hose and a part which is surrounded by the hose within the confines of the looped median portion of the band. The likelihood of leakage is especially pronounced if the fluid which is to flow through the hose is maintained at a relatively high pressure.

Shortening of the bottom wall by removing its end portions (as considered in the circumferential direction of the looped median portion of the band) is not desirable in or is plainly detrimental to the patented hose clip (e.g., under the aforementioned circumstances), even though a shorter bottom wall could more readily conform to the outline of the structure within the confines of the looped median portion of the band. If the bottom wall of the housing is relatively short, the housing is more likely to be tilted in response to rotation of the screw in a direction to tension the band whereby the lower part of one side wall of the housing strikes against the band. In the absence of such contact with the band, the housing would be likely to change its orientation with reference to the screw in such a way that its tubular section would not be coaxial with the shank. Also, the aforementioned shoulder between the shank and the head of the screw would become disengaged from the adjacent end portion of the housing. Tilting or a similar undesirable change of orientation of the housing with reference to the screw is especially likely to occur if the cutout in the cylindrical portion of the aforementioned insert which is used in the patented hose clips is remote from the bottom wall of the housing. When the lower end of a side wall of the housing strikes against the band, the threaded end portion of the band cannot be readily moved lengthwise because the housing is likely to engage the thread of the band and to oppose rotation of the screw in a direction to increase the tensional stress upon the band. Undesirable engagement between the housing and the thread on the band is particularly likely to occur when the housing consists of sheet metal and the thread on the band is formed by stamping, forging or a similar procedure. The edge faces of the metallic housing will penetrate into the grooves, slots or analogous depressions or apertures between the portions of the thus formed thread on the band.

OBJECTS AND SUMMARY OF THE INVENTION

An object of the invention is to provide a novel and improved hose clip wherein the housing is constructed and assembled in such a way that it can cooperate with the rotary tensioning element to hold the latter against undesirable stray movements in the radial and/or axial direction of the externally threaded portion of the tensioning element or vice versa.

Another object of the invention is to provide the hose clip with novel and improved means for coupling the housing to the tensioning element in such a way that the latter can be readily rotated in a direction to increase the tensional stress upon the band and/or in the opposite direction.

A further object of the invention is to provide a hose clip wherein the tensioning element can subject the band to greater tensional stresses than in heretofore known hose clips.

An additional object of the invention is to provide novel and improved means for preventing undue or untimely deformation of the housing in a hose clip of the above outlined character.

A further object of the invention is to provide the housing and/or the tensioning element of a hose clip with novel and improved means for preventing penetration of the head of the tensioning element into the interior of the housing.

An additional object of the invention it to provide a novel and improved tensioning element for use in a hose clip of the above outlined character.

Another object of the invention is to provide the hose clip with a housing which exhibits the above outlined features and advantages in spite of the fact that it allows for convenient threading of the band therethrough.

The invention is embodied in a clip or clamp for hoses, pipes, nipples or analogous structures. The clip comprises an elongated band having a threaded end portion and a second portion, a housing connected with the second portion of the band and including or consisting of a tubular section (e.g., a section which resembles a tunnel), and a tightening or tensioning element (e.g., a screw) having (a) an externally threaded shank which is rotatably mounted in the tubular section of the housing and meshes with the thread on the end portion of the band and (b) a larger-diameter head. The head has a tubular portion, and the tubular section of the housing has an end portion which is surrounded by the tubular portion of the head so that the head holds the end portion of the tubular section against radial and axial movement relative to the tensioning element, and vice versa. The tubular portion of the head may constitute a circumferentially complete cylindrical member. It is preferred to construct or machine the tubular portion in such a way that its outer diameter decreases in a direction toward its free end; this reduces the likelihood of interference with introduction of the threaded end portion of the band into the tubular section between a bottom wall of the tubular section (which is connected to the second portion of the band) and the thread on the shank of the tensioning element.

The tubular portion of the head may be integral with the shank, it may be rotatably mounted on the shank, or it may be machined or otherwise produced as a separate part and is thereupon attached to the remaining portion of the head, e.g., by bonding (preferably by welding), merely by friction or in another suitable way.

The aforementioned end portion of the tubular section of the housing is preferably an arcuate part, most preferably a partly cylindrical portion, so that it can be received in an annular recess which is surrounded by the tubular portion of the head.

The novel features which are considered as characteristic of the invention are set forth in particular in the appended claims. The improved hose clip itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
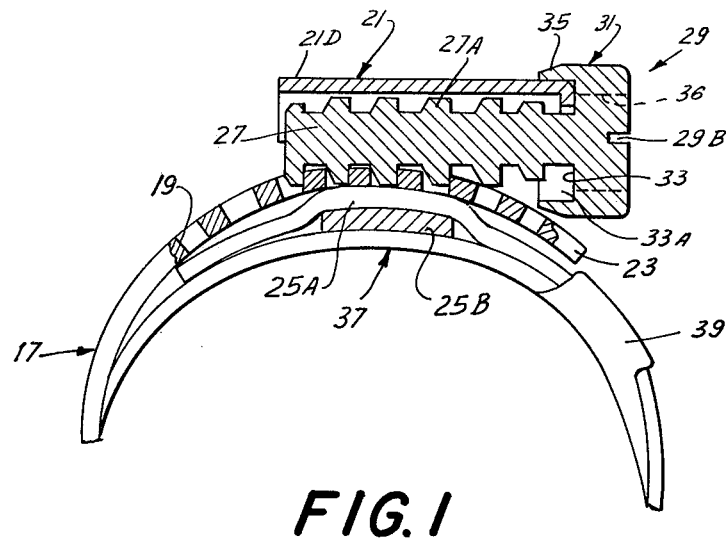
FIG. 1 is a sectional view of a hose clip which embodies one form of the invention, the tensioning element being shown in engagement with the externally threaded end portion of a band.

FIG. 1 shows a hose clip which comprises a housing 21, an externally threaded tensioning element or screw 29, an elongated band 17, and an arcuate back support 37. The band 17 can be looped around a hose, pipe or an analogous structure so as to clamp such structure to another part. By way of example, the band 17 can be placed around one end portion of a hose while such end portion surrounds a nipple. The band 17 is thereupon tensioned so as to ensure that the end portion of the hose is maintained in sealing engagement with the external surface of the nipple. This is but one of a host of possible applications of the clip.

The end portion 23 (or a longer portion) of the band 17 is formed with openings in the form of elongated transversely extending slots 19 which form between themselves a series of parallel ribs constituting a rudimentary thread meshing with the thread 27A on the shank or stem 27 of the screw 29 which is rotatable in a tubular section 21D of the housing 21. The tubular section 21D of the housing 21 has a substantially flat bottom wall 21B which is disposed between the central portion of the back support 37 and the inner side of the second end portion 25 of the band. The end portion 25 has a bulge 25A which overlies the bottom wall 21B of the tubular section 21D. The bulge 25A reduces the likelihood of axial shifting of the tubular section 21D along the band 17 and/or of lengthwise movement of the end portion 25 with reference to the housing 21.

The larger-diameter end portion or head 31 of the screw 29 is constructed in such a way that it prevents the shank 27 from moving axially and/or radially relative to the tubular section 21D. In addition, the head 31 prevents expansion of the section 21D. The section 21D is likely to be expanded if it confines the shank of a conventional screw, e.g., a screw having a head 36 which is indicated in FIG. 1 by broken lines. The same holds true if the head 36 is replaced with a substantially frustoconical head.

In order to perform the just-enumerated desirable functions, the head 31 is formed with a tubular portion 35 which is a circumferentially complete cylinder and surrounds an annular recess 33A having a ring-shaped bottom wall 33. The adjacent end portion of the tubular section 21D has an inwardly extending collar 41 whose outer side abuts against the surface 33 in the recess 33A. At the same time, the tubular portion 35 surrounds the respective end portion of the section 21D so that the head 31 is evidently incapable of penetrating into the housing 21. The tubular portion 35 is integral with the shank 27 and with the remaining part of the head 31.

The back support 37 has outwardly extending projections or lugs 39 which overlie the end portion 25 of the band 17 at the opposite ends of the bulge 25A, i.e., at the two axial ends of the tubular section 21D of the housing 21. The lugs 39 can be provided with outwardly extending protuberances in the form of pins or ribs which can extend into the openings 19 of the end portion 23 to hold the latter against lengthwise movement relative to the housing 21. The configuration of the concave inner side of the back support 37 determines the configuration of the adjacent portion of the hose or an analogous deformable structure which is clamped by the band 17 when the end portions 23, 25 extend through the housing 21 and the screw 29 is rotated in a direction (preferably clockwise) to tighten the band, i.e., to apply to the band a tensional stress via end portion 23 and to thus reduce the size of the looped median portion of the band.

Since the tubular portion 35 of the head 31 of the screw 29 surrounds the adjacent end portion of the tubular section 21D, the screw 29 is positively and reliably held against tilting in a clockwise direction about an axis which is normal to the plane of FIG. 1, namely, about an axis which is normal to the plane coinciding with the central symmetry plane of the assembled clip and including the axis of the shank 29. Such tendency of the screw 29 to tilt about an axis which extends at right angles to the plane of FIG. 1 develops when the screw 29 is rotated in a direction to tension the band 17. As mentioned above, the thread 27A on the shank 27 is assumed to be a right-hand thread, i.e., the shank 27 must be rotated clockwise in order to cause the end portion 23 of the band 17 to advance in a direction to the right, as viewed in FIG. 1. When the screw 29 is rotated to tension the band 17, i.e., to apply a gradually increasing tensional stress to the looped median portion of the band, the stress is transmitted to the lower portion of the thread 27A, i.e., to that portion which meshes with the ribs between the openings or slots 19 in the end portion 23.

Were the head a constituent of a conventional screw (as stated above, one form of a conventional head is indicated in FIG. 1 by broken lines 36), or if the head of the screw would resemble the frustum of a cone, the absence of tubular portion 35 would enable such conventional screw to pivot in a clockwise directon, as viewed in FIG. 1 (i.e., to pivot in the plane of FIG. 1) to such an extent that the head (36) would be free to penetrate into the adjacent end portion of the tubular section 21D with the result that the housing 21 would be destroyed because the section 21D would expand and would ultimately break (burst). Such expansion or bursting of the tubular section 21D would be even more likely because the bottom wall 21B of the housing 21 is relatively short in order to ensure that the end portions 23, 25 of the band 17 can be introduced into and allowed to move from the tubular section 21D. The bottom wall 21B is relatively short on the additional ground that the end portion 25 is formed with the aforementioned bulge 25A; this bulge must be introduced in such a way that it overlies and surrounds three sides of the bottom wall 21B.

The provision of the collar 41 at the right-hand end of the tubular section 21D of the housing 21 contributes to stiffness of the corresponding end portion of the housing. Actually, the collar 41 constitutes a seat along which the surface 33 in the recess 33A slides when the head 31 of the screw 29 is rotated in a direction to tension or to reduce the tensional stress upon the band 17. Since the right-hand end portion of the section 21D is stiffened by the collar 41, and since this end portion is surrounded by the circumferentially complete tubular portion 35 of the head 31, the screw 29 cannot pivot clockwise about an axis which extends at right angles to the plane of FIG. 1 and the head 31 cannot penetrate into the interior of the section 21D. Thus, the section 21D remains intact even if the band 17 is subjected to very pronounced tensional stresses.

FIG. 1 further shows that the outer diameter of the tubular portion 35 decreases in a direction toward the free end of such tubular portion, i.e., in a direction away from the bottom wall 33 in the recess 33A. Otherwise stated, at least a part of the tubular portion 35 tapers inwardly toward the axis of the shank 27 in a direction toward the left-hand end portion of the tubular section 21D. Therefore, at least the left-hand part of the tubular portion 35 is bounded by a conical or substantially conical surface which facilitates the threading of the end portion 25 through the housing 21 between the bottom wall 21B and the shank 27. As shown in FIG. 1, the end portion 23 of the band 17 extends between the shank 27 and the end portion 25. In the absence of any taper (roughness or conicity) at the free end of the tubular portion 35, the leader of the end portion 23 would be likely to be caught and intercepted by the tubular portion 35.

The head 31 of the screw 29 has a diametral slot 29B for the working end of a screwdriver or an analogous rudimentary tool serving to rotate the shank 27 in the tubular section 21D.

An important advantage of the hose clip of FIG. 1 is that the head 31 of the screw 29 cannot be shifted relative to the tubular section 21D in a direction toward the right-hand lug 39 of the back support 37 so that it would enter the tubular section 21D between the sleeve 41 and the right-hand end of the bottom wall 21B. In other words, the scew 29 cannot pivot clockwise about the axis of the structure which is surrounded by the (non-illustrated) looped median portion of the band 17, even if the shank 27 is rotated in a direction to reduce the size of the looped median portion of the band 17 subsequent to pronounced tensioning of the band. Moreover, and since the orientation of the tubular section 21D with reference to the screw 29 remains unchanged, the number of slots 19 which receive portions of the thread 27A is large so that tensional stress is transmitted simultaneously to a large number of ribs between the slots 19 of the end portion 23. Therefore, the lead of the thread 27A on the shank 27 can be relatively small which, in turn, enables the operator to generate a substantial tensional stress in response to the application of a relatively small torque. All this is attributable, at least in part, to the feature that the right-hand end portion of the tubular section 21D extends into a circumferentially complete recess 33 of the head 31, i.e., that this head comprises a circumferentially complete tubular portion 35 which prevents the head from penetrating (in its entirety) into the housing 21 and/or of expanding the right-hand end portion of the tubular section 21D.

An advantage of a screw wherein the tubular portion 35 is integral with the shank 27 and with the remaining portion of the head 31 is that the making of the screw often requires less time than the manufacture of a screw which, at one or more stages of its making, consists of two or more discrete parts.

The right-hand end portion of the tubular section 21D is arcuate; the outline of such end portion preferably forms part of a circle so that it can readily enter the recess 33 in the left-hand end face of the head 31. Such cylindrical configuration of the right-hand end portion of the section 21D is desirable on the additional ground that the section 21D does not offer excessive resistance to rotation of the screw 29, i.e., frictional engagement between the head 31 and the section 21D is not more pronounced than that which is desired by the manufacturer. The desirability of pronounced frictional or other engagement between the head of the screw and the tubular section of the housing under certain circumstances (for example, to prevent excessive tensioning of the band) will be described in connection with FIGS. 14 and 15.

It has been found that a circumferentially complete tubular portion (such as 35) is capable of withstanding very pronounced forces which tend to pivot the screw relative to the housing in a direction to withdraw the right-hand end portion of the tubular section 21D from the recess 33. Such forces greatly exceed those forces which are needed to disengage the part-cylindrical portions of inserts from the respective end portions of housings in the hose clips of the aforementioned British and French patents. This holds true regardless of whether or not the tubular portion rotates with the remaining portion of the head 31. Moreover, gradual reduction of the outer diameter of the tubular portion 35 toward its free end invariably insures that the end portion 23 of the band 17 can be readily threaded through the tubular section 21D.

A circumferentially complete tubular portion of the head can stand greater torsional and/or other deforming stresses than the part-cylindrical portions of inserts in the patents to Jamie and Robinson.

Figures 2, 3, 4:
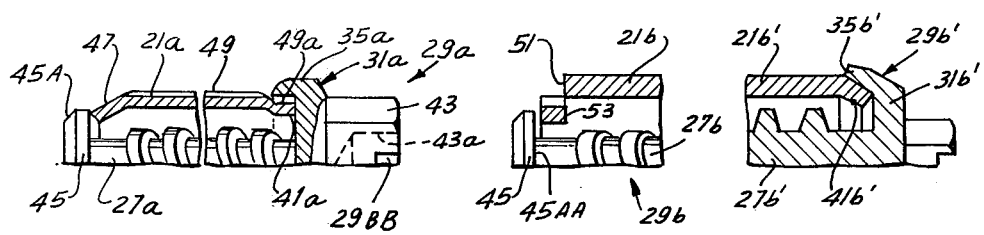
FIG. 2 is a fragmentary axial sectional view of a modified housing and a partly elevational and partly axial sectional view of a modified tensioning element.
FIG. 3 is a fragmentary axial sectional view of a third housing and a fragmentary elevational view of a third tensioning element.
FIG. 4 is a fragmentary axial sectional view of a fourth housing and a fragmentary partly elevational and partly axial sectional view of a fourth tensioning element.

FIG. 2 illustrates a portion of a modified hose clip wherein the housing 21a has a tubular section for the shank 27a of a modified screw 29a. The head 31a of the screw 29a has a polygonal (preferably hexagonal) external surface 43 and an axial socket 43A which is bounded by a polygonal (preferably hexagonal) surface so that the screw 29a can be rotated by any one of several tools. In addition, the head 31a has a diametrically extending slot 29BB for the working end of a screwdriver or for a portion of a coin which can be used to rotate the shank 27a clockwise or counterclockwise, i.e., to increase or reduce the tensional stress upon the band. As a rule, a wrench or another tool which engages the surface 43 or extends into the socket 43A can subject the band (not shown in FIG. 2) to a more pronounced tensional stress than a screwdriver or a like tool which is inserted into the slot 29BB when the operator wishes to rotate the shank 27a.

The tubular portion 35a of the head 31a shown in FIG. 2 is rounded at its free end so that its outer diameter decreases in a direction toward the left-hand end portion 47 of the tubular section of the housing 21a. The just described configuration of the tubular portion 35a can be achieved by cold forming or by resorting to a material removing machine (e.g., a turning lathe). The purpose of the rounded part of the tubular portion 35a is to reduce the likelihood of interception of the leader of the threaded end portion of the band while such end portion is guided through the housing 21a.

The free end portion or tip of the shank 27a is formed or connected with a ring-shaped flange 45 which has a frustoconical facet 45A. The flange 45 cooperates with the end portion or stop 47 of the housing 21a so as to prevent extraction of the shank 27a from the tubular section of the housing while the screw is rotated in a direction to reduce the tensional stress upon the band. The end portion 47 is deformed to resemble the frustum of a hollow cone subsequent to proper insertion of the shank 27a into the tubular section of the housing 21a in such a way that the flange 45 extends beyond the left-hand end of the tubular section.

The tubular section of the housing 21a has one or more elongated reinforcing or stiffening ribs 49 which are parallel to the axis of the shank 27a. Additional reinforcing ribs 49a (which may but need not be parallel to the illustrated rib 49) are provided at the exterior of the right-hand end portion 41a of the tubular section of the housing 21a. It will be noted that the end portion 41a does not have or does not constitute an inwardly extending collar, such as the collar 41 of the tubular section 21D shown in FIG. 1. Thus, the end portion 41a is part of a cylinder or tube whose end face abuts against the bottom surface in the recess which is machined into the left-hand end face of the head 31a.

FIG. 3 shows a portion of a modified housing 21b whose tubular section is formed with a different stop for a flange 45 at the free end or tip of the shank of stem 27b of a screw 29b. The stop 53 of FIG. 3 is simply an inwardly bent portion of the material of the housing 21b. To this end, the tubular section of the housing 21b is formed with an arcuate slit 51 and the housing portion between the slit 51 and the left-hand end of the tubular section is deformed so that it extends inwardly of the flat right-hand end face 45AA of the flange 45b. The stop 53 is deformed to extend in front of the end face 45AA subsequent to full insertion of the shank 27b into the housing 21b. This stop can be used as a substitute for the hollow frustoconical end portion or stop 47 of the tubular section of the housing 21a shown in FIG. 2.

REferring to FIG. 4, there is shown a portion of a further hose clip with a housing 21b' having a tubular section which surrounds the shank or stem 27b' of a screw 29b'. The head 31b' of the screw 29b' comprises a tubular portion 35b' which flares outwardly toward the left-hand end of the tubular section of the housing 21b' and has a frustoconical internal surface engaging the complementary frustoconical external surface of the right-hand end portion 41b' of the tubular section. The construction of FIG. 4 is desirable when the designer wishes to reduce the outer diameter of the head 31b' to a minimum so as to further reduce the likelihood of interception of the threaded end portion of the band while such end portion is guided through the housing 21b'. In addition, the construction of FIG. 4 furnishes a large surface-to-surface contact between the end portion 41b' and the tubular portion 35b' to thus ensure that the screw 29b' is adequately held against undesirable axial and/or radial movement relative to the tubular section of the housing 21b'.

Figures 5, 6, 7:
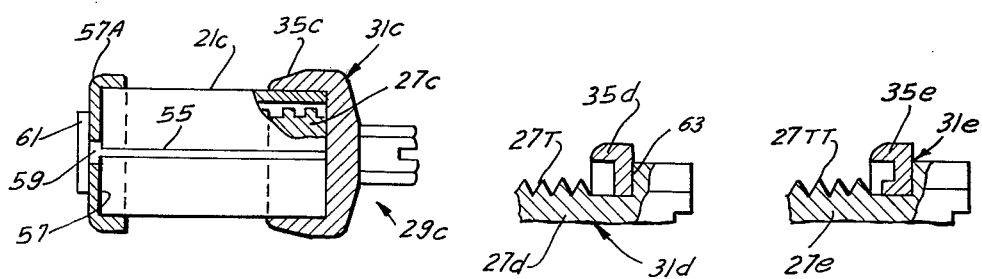
FIG. 5 is a top plan view of a fifth housing, with a portion broken away, and a partly elevational and partly sectional view of a fifth tensioning element.
FIG. 6 is a fragmentary partly elevational and partly axial sectional view of a sixth tensioning element.
FIG. 7 is a similar view of a seventh tensioning element.

FIG. 5 illustrates a portion of a further hose clip wherein the tubular section of the housing 21c is not or need not be a circumferentially complete body. This housing can be made by suitable deformation of a flat sheet metal blank so as to form a cylinder with an axially parallel slot 55 between two neighboring end faces of the deformed blank. The slot 55 is preferably moved to a position of maximum distance from the two end portions of the band (not shown in FIG. 5). This renders it unnecessary to weld the housing 21c in order to eliminate the slot 55. In addition, the housing 21c is reinforced in several ways to compensate for the absence of a circumferentially complete tubular section for the shank 27c of the screw 29c. The head 31c of the screw 29c has a tubular portion 35c which surrounds the cylindrical right-hand end portion of the housing 21c. In addition, the free end or tip of the shank 27c has a neck portion 59 which is inwardly adjacent to a disc 61 and is surrounded by a washer-like end wall 57 whose marginal portion is deformed to form a short circumferentially complete cylinder or tubular portion 57A surrounding the left-hand end portion of the tubular section of the housing 21c. The end wall 57 further constitutes a stop (analogous to the stop 47 or 53) which cooperates with the left-hand end portion of the housing 21c to prevent axial back movements of the shank 27c. The disc 61 resembles or constitutes a rivet head.

The bottom wall of the housing 21c is preferably a one-piece member because it is subjected to very pronounced stresses when the clip including the structure of FIG. 5 is in actual use. Such bottom wall is assumed to be located opposite (behind) the slot 55 and is connected to the end portion 25 of the band 17 (not shown in FIG. 5). The collar 41 can be omitted, i.e., the right-hand end portion of the housing 21c constitutes a portion of a cylinder which does not have a radially inwardly extending portion. This reduces the manufacturing cost.

FIG. 6 shows a portion of a modified screw 29d having a shank 27d and a head 31d. The tubular portion 35d of the head 31d is a cupped part which is produced independently of the shank 27d and of the remaining portion of the head 31d and is thereupon bonded to the remaining portion of the head, as at 63. The bond is preferably a butt welded seam which insures that the tubular portion 35d shares all axial and angular movements of the screw 29d.

The bond (at 63) is not absolutely necessary, i.e., the tubular portion 35d can rotate relative to the shank 27d and relative to the remaining portion of the head 31d. The thread 27T on the shank 27d can be formed by rolling prior or subsequent to attachment or mounting of the tubular portion 35d on the remaining portion of the head 31d. Rolling of the thread 27T subsequent to installation of the tubular portion 35d simplifies the placing of such tubular portion adjacent to the left-hand end face of that portion of the head 31d which is integral with the shank 27d. Rolling of the thread is advantageous and desirable regardless of whether or not the tubular portion 35d is permanently secured to the remainder of the screw 29d.

The screw 29e of FIG. 7 includes a head 31e with a tubular portion 35e which is formed in two stages including a first stage of deep drawing a metallic sheet material. The thus partly finished tubular portion 35e is forcibly slipped onto the shank 27e prior to rolling of the thread 27TT. Frictional engagement between the tubular portion 35e and the shank 27e and/or the remaining portion of the head 31e suffices to insure that the tubular portion 35e shares all angular movements of the shank 27e.

Figure 8:
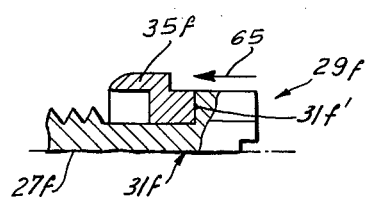
FIG. 8 is a similar view of an eight tensioning element.

Referring to FIG. 8, there is shown a screw 29f which comprises a two-piece head 31f and a shank 27f with rolled external threads. The head 31f comprises a first part which has a hexagonal external surface and is integral with the shank 27f, and a second part which is manufactured separately and is attached to or placed next to the first part prior to rolling of the thread on the shank 27f. The second part is originally a washer. Prior to slipping it over the shank, the washer is deformed in part by moving only its radially outer part in the direction indicated by arrow 65 so that the left-hand part thereof constitutes a tubular portion 35f and the right-hand part thereof constitutes a hub which is adjacent to the shoulder 31f'. The procedure which is resorted to in making the screw 29f of FIG. 8 is known as the tool technique. The material of the aforementioned washer is deformed in the course of a shearing operation but without complete shearing. The next step involves the formation of the hub which is obtained by forcing the material of the washer against the smooth external surface of the shank 27f and against the shoulder 31f'. The thread on the shank 27f is rolled during the last stage of making of the screw 29f.

Figure 9A:
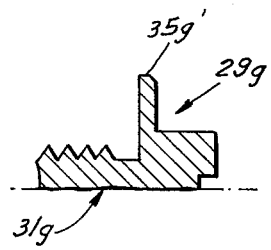
FIG. 9A is a fragmentary axial sectional view of a partly finished ninth tensioning element.
Figure 9B:
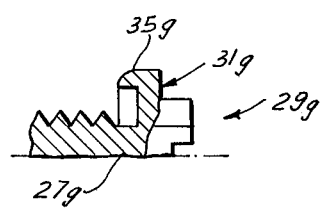
FIG. 9B is a fragmentary partly elevational and partly axial sectional view of the finished ninth tensioning element.

FIGS. 9A and 9B show two stages of a method of making a modified screw 29g. The first stage involves the making of a one-piece screw whose head is configurated in a manner as shown in FIG. 9A. The outwardly extending flange 35g' of the head 31g is thereupon converted into a tubular portion 35g by deep drawing. This completes the making of the screw 29g. The thread on the shank 27g can be rolled or otherwise formed prior or subsequent to the deep drawing step.

Figure 10B:
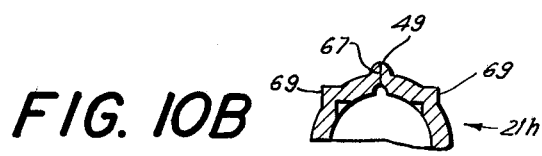
FIG. 10A is a perspective view of a sixth housing.
FIG. 10 B is a transverse sectional view of the housing which is shown in FIG. 10A.
Figure 10A:
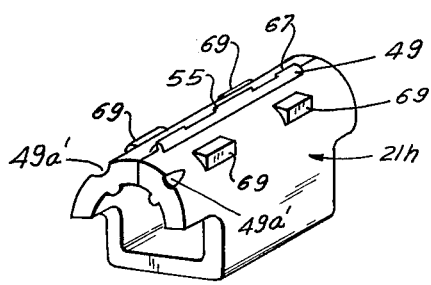

FIGS. 10A and 10B show a housing 21h whose upper part has a substantially semicylindrical outline so as to allow for rotation of the tensioning screw, not shown. The housing 21h can take screws wherein the tubular portions are integral with, rigidly connected to or rotatable relative to the remaining parts of the heads. Thus, the housing 21h can take any of the screws shown in FIGS. 1, 2, 3, 4, 5, 6, 7, 8 and 9A–9B. The end portions of the upper part of the housing 21h extend beyond the lower part of the housing so that the tubular portion of the head of the screw whose shank is inserted into the housing 21h can readily rotate around the respective arcuate end portion of the upper part of the housing.

The housing 21h of FIGS. 10A and 10B resembles the housing 21c of FIG. 5 except that the two adjacent edge faces of the blank which has been converted into housing 21h are butt welded to each other in the region of a reinforcing rib 49 which is parallel to the axis of the upper part of the housing 21h. The reinforcing rib 49 is shorter than the upper part of the housing 21h and the two regions 67 where the housing is welded are located at the two ends of the rib 49. Additional reinforcing ribs 69 of substantially triangular cross-sectional outline are provided on the upper part of the housing 21h at the opposite sides of and extend in parallelism with the rib 49. Those portions of the welded seams 67 which extend or might extend inwardly into the interior of the housing 21h are received in the partially sealed slot 55 so that they do not interfere with movements of the thread on the screw which is used with the housing of FIGS. 10A and 10B. As shown in FIG. 10B, the internal surface of the upper part of the housing 21h has a groove in the region of each of the three reinforcing ribs 49, 69, 69 so that eventual parts of welds which extend inwardly are received in the groove below the rib 49. The cross-sectional configuration of the housing 21h resembles that of a tunnel, i.e., its upper part is substantially semicylindrical and its lower part is substantially U-shaped.

The rib 49 (which is halved by the slot 55) opposes the deforming stresses which develop when the screw is rotated in a direction to tension the band. Such stresses are transmitted by the shank of the screw in the housing 21h. This housing consists of a single section, namely, of a tubular section which receives the shank of the screw. Since the rib 49 is formed by bending the material of the two parts at the opposite sides of the slot 55 outwardly, the innermost portion of the slot 55 constitutes a groove which extends in parallelism with the axis of the shank of the tensioning screw and can receive the innermost portions of the material which is used to form the welded connections 67 (provided that such material penetrates all the way into the innermost portions of the slot 55).

The reference characters 49a' denote notches in the outer side of one end portion of the housing 21h.

Figure 11:
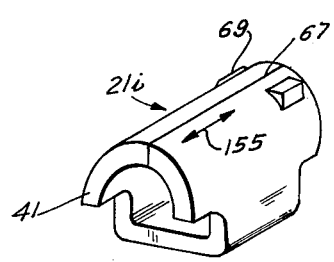
FIG. 11 is a perspective view of a seventh housing.

FIG. 11 shows a housing 21i which constitutes a simplified version of the housing 21h and is similar to the housing 21c of FIG. 5. The clearance or slot 55 is interrupted by a single relatively short welded seam 67 in the region of that end of the housing 21i which is remote from the head of the screw, not shown. The other end of the housing 21i is held against spreading by the tubular portion of the head on the screw which is used with the housing of FIG. 11.

Figure 12A:
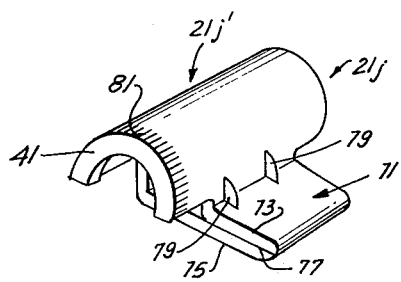
FIG. 12A is a perspective view of an eight housing.
Figure 12B:
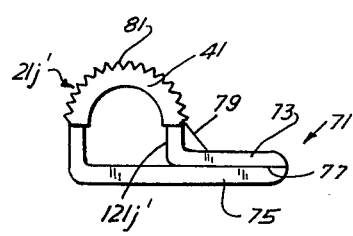
FIG. 12B is an end elevational view of the housing which is shown in FIG. 12A.

FIGS. 12A and 12B illustrate a further housing 21j which is similar to that disclosed in my commonly owned copending application Ser. No. 100,060 filed Dec. 4, 1979 and entitled "Housing for tightening elements of hose clips". The housing 21j is made of a flat sheet metal blank which is deformed to provide a tubular section 21j' and an extension 71. The extension 71 projects laterally from the tubular section 21j' and includes two substantially flat plate-like components 73, 75, the latter of which constitutes the bottom wall of the tubular section 21j'. The component 73 is integral with the adjacent side wall 121j' of the tubular section 21j' and makes an angle of less than 180 degrees (preferably an angle of approximately 90 degrees) with such side wall. The width of the extension 71, as measured radially of the tubular section 21j', at least equals and may exceed the diameter of the shank of the screw which is used with the housing 21j.

The components 73, 75 of the extension 71 abut against each other and are welded, otherwise bonded or riveted to each other. In the embodiment of FIGS. 12A and 12B, the components are welded to each other, as at 77.

The housing 21j has reinforcing ribs 79 which are provided at its exterior in the corner between the side wall 121j' and the component 73 of the extension 71. These ribs prevent pivoting of the extension 71 relative to the tubular section 21j' in the region below the side wall 121j', as viewed in FIG. 12B. Such pivoting could take place in response to rotation of the screw in a direction (normally clockwise) to tension the band around a hose or the like.

The purpose of the extension 71 is fully described in the aforementioned commonly owned copending application Ser. No. 100,060. This extension reduces the likelihood of turning of the housing 21j about the axis of the screw when the latter is rotated in a direction to apply additional tensional stress to the looped portion of the band. The shank of the screw tends to roll along the threaded end portion of the band and to rotate the housing 21j in the same direction. The tendency of the housing 21j to turn with the screw is even more pronounced if the screw has a tubular portion (such as the portion 35 of the screw 29 shown in FIG. 1) because the tubular portion enables the screw to apply more pronounced tensional stresses, i.e., the housing is less likely to expand and to allow the head 31 of the screw to penetrate into its interior if the head has a tubular portion which surrounds the adjacent end portion of the tubular section of the housing. It has been found that the tensional stress applied by a screw whose head has a tubular portion (such as 35) is much greater than when the screw is mounted in such a way that it is held solely against uncontrolled axial movement with respect to the housing.

Figure 13A:
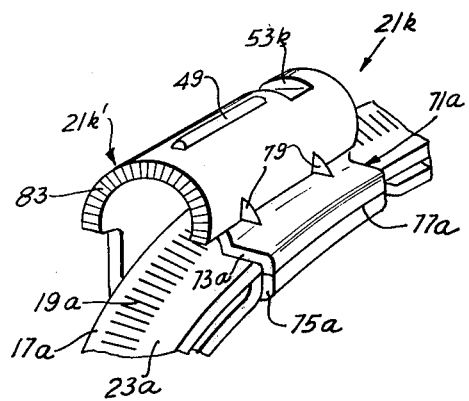
FIG. 13A is a fragmentary perspective view of a hose clip which embodies a further housing with the tensioning element omitted.
Figure 13B:
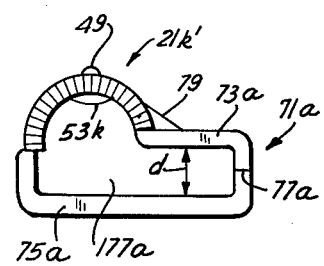
FIG. 13B is an end elevational view of the housing which is shown in FIG. 13A.

FIGS. 13A and 13B show a further housing 21k having a tubular section 21k' and a hollow tubular extension 71a. The outer or free end portions of the components 73a, 75a of the extension 71a are bent at right angles to the major parts of such components so that such end portions are located in a common plane and can be butt welded to each other, as at 77a. The height d of the compartment 177a between the components 73a, 75a (i.e., the distance between the major parts of such components) equals or approximates the combined thickness of the two end portions 23a, 25a of a flexible band 17a which is shown in FIG. 13A. The left-hand marginal portion of the end portion 23a has parallel grooves 19a which alternate with ribs constituting a rudimentary thread which meshes with the thread of a screw, not shown, in the tubular section 21k' of the housing 21k. The right-hand marginal zones of the end portions 23a, 25a of the band 25a extend into the compartment 177a. The grooves 19a can be replaced with slot-shaped openings (19) of the type shown in FIG. 1. When the screw in the tubular section 21k' is rotated in a direction to tension the band 17a by pulling the end portion 23a in a direction to the right, as viewed in FIG. 13A, the screw tends to turn the housing 21k clockwise, as viewed in FIG. 13A or 13B so that the extension 71a tends to move toward the structure which is surrounded by the band 17a. The same holds true for the extension 71 of FIGS. 12A and 12B. The extension 71a exhibits the advantage that the housing 21k can be used with a relatively wide band 17a because parts of the end portions 23a, 25a of such band can extend into the compartment 177a between the major portions of the components 73a and 75a. Moreover, the U-shaped extension 71a contributes to stiffness of the housing 21k.

The tubular section 21k' of the housing 21k is formed with a stop 53k which corresponds to the stop 53 of FIG. 3. It will be noted that, when a screw is inserted into the housing 21k, the head of such screw is adjacent to the left-hand end of the tubular section 21k', i.e., it is closer to the observer of FIG. 13A than the tip of the shank. The stop 53k is more remote from the nearest end face of the tubular section 21k' than the stop 53 of FIG. 3. The screw which is used in or with the housing 21k of FIGS. 13A or 13B has a flange (such as 45 or 45b) which cooperates with the stop 53a to prevent extraction of the screw and to prevent or reduce the likelihood of rotation of the screw in one direction, especially when the screw is rotated in the (opposite) direction to reduce the tensional stress upon the band 17a.

Figure 14:
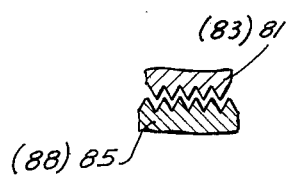
FIG. 14 is an enlarged fragmentary sectional view of the housing of FIGS. 12A and 12B and a similar fragmentary sectional view of the associated tensioning element.

In each embodiment of the invention, the housing can be provided with a set of teeth (such as the teeth 81 shown in FIGS. 12A, 12B and 14) which cooperate with complementary teeth (85) on the head of the screw to reduce the likelihood of excessive tensioning of the band 17 or 17a. The teeth 81 of FIGS. 12A and 12B are parallel to the axis of the screw which is installed in the tubular section 21j' and are provided at one axial end of such tubular section. The teeth 85 are provided at the internal surface of the tubular portion (such as 35) of the head on the respective screw. FIG. 14 shows that each tooth 81 and each tooth 85 has two mirror symmetrical halves with reference to a plane which includes the axis of the screw. This allows for rotation of the screw (having the teeth 85) in a clockwise or counterclockwise direction, i.e., to increase or reduce the tensional stress upon the band 17 or 17a. These teeth perform the following function: When an operator wishes to increase the tensional stress upon the band, he or she uses a tool which can rotate the respective screw in the appropriate (normally clockwise) direction. Owing to the provision of teeth 81 and 85, the head of the screw (e.g., the head 31 of the screw 29 shown in FIG. 1) ratchets along the adjacent end portion of the tubular section of the housing because such end portion is formed with the axially parallel teeth 81. This means that the operator must overcome a stepwise increasing resistance while the teeth 85 of the head 31 move from a first set of tooth spaces between the teeth 81, over the adjacent teeth 81 and into the next set of tooth spaces (at the opposite sides of such teeth 81). The effort which must be exerted in order to make the top lands of teeth 85 ride over the top lands of teeth 81 increases proportionally with increasing tensional stress upon the band 17 or 17a. Therefore, the teeth 81 and 85 contribute to a reduction of the likelihood of excessive tensioning of the band 17 or 17a. When the tensional stress upon the band 17 or 17a is to be reduced, the screw 29 is rotated in the opposite direction whereby the teeth 85 again ride over the teeth 81 but in a counterclockwise direction.

In addition to or instead of the teeth 81 and 85, the housing and the screw of the improved clip can be provided with two sets of radially extending teeth of the type shown in FIGS. 13A, 13B and 14. That end face of the tubular section 21k' which is adjacent to the head of the screw (not shown in FIG. 13A) has a set of teeth 83 which extend radially of the axis of the screw. The head of the screw has a set of complementary radial teeth 88 (shown only in FIG. 14) which can be formed in the bottom surface of the annular recess in the head of the respective screw (e.g., in the bottom surface 33 of the head 31 shown in FIG. 1). The teeth 83 and 88 cooperate in the same way as described in connection with the teeth 81 and 85, i.e., such teeth reduce the likelihood of the application of excessive tensional stresses to the band 17 or 17a because the teeth 88 must ride over the teeth 83 and such ratcheting of the head of the screw relative to the tubular section of the housing becomes more difficult as the tensional stress upon the band increases.

The teeth 83, 88 can be used in addition to or as a substitute for the teeth 81 and 85. Such teeth not only prevent or reduce the likelihood of the application of excessive tensional stresses to the band 17 or 17a but also reduce the likelihood of accidental loosening of the band when the clip is in actual use.

It is often sufficient to provide teeth solely on the tubular section of the housing or solely on the screw. If the material of the screw or housing is at least slightly ductile, the teeth 81 or 83 on the housing will cut complementary teeth on the originally smooth surface of the associated head or vice versa. In other words, a set of teeth 81 or 83 on the tubular section of the housing can provide the head of a screw with complementary teeth corresponding to those shown at 85 and 88, and a set of teeth 85 or 88 on the head of a screw can make complementary teeth 81 or 83 on the associated tubular section.

Figure 15:
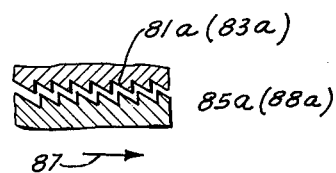
FIG. 15 is a fragmentary sectional view which is similar to that of FIG. 14 but shows a modified housing and a modified tensioning element.

FIG. 15 shows that the teeth (81a, 83a and 85a, 88a) on the housing and screw can have a non-symmetrical profile (e.g., a sawtooth profile). This ensures that the screw can be rotated in a direction (arrow 87) to increase the tensional stress upon the band 17 or 17a but cannot be rotated in the opposite direction. In other words, a band which is applied and tensional by resorting to a housing having teeth 81a and/or 83a and to a screw having teeth 85a and/or 88a cannot be removed except by destroying portions of the entire teeth.

Each of the teeth shown in FIG. 15 has a first flank which extends substantially radially of the screw and a second flank which makes an acute angle with the direction (arrow 87) in which the screw must be rotated in order to tension the band 17 or 17a. Such teeth prevent accidental as well as intentional loosening of the band.

The improved hose clip is susceptible of many additional modifications without departing from the spirit of the invention. For example, the end faces bounding the clearance or slot 55 shown in FIG. 11 can be provided with mating teeth which prevent shifting of one half of the housing 21i relative to the other half when the screw which is installed in the housing 21i exerts a more pronounced axial stress upon the one half than upon the other half. The teeth can be configured and/or distributed and/or oriented in such a way that they prevent axial movement of either half in both directions, i.e., in the directions indicated by the double-headed arrow 155. It is also possible to omit the welded seam 67 of FIG. 11 if the two halves of the housing 21i have complementary tongues and grooves, lugs and sockets or analogous connections which do not require bonding but mere deformation of the male parts so that they enter the complementary female parts of the connections. This also holds true for the housing 21h and is especially advantageous when the surfaces bounding the slot 55 are toothed in a manner as described above in connection with the housing 21i.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A hose clip, comprising an elongated band having a threaded end portion and a second portion; a housing connected with said second portion and including a tubular section; and a tensioning element having an externally threaded shank rotatably mounted in said tubular section and meshing with the thread of said end portion and a larger-diameter head, said head having a tubular portion and said tubular section of said housing having an end portion which is surrounded by said tubular portion.

2. The hose clip of claim 1, wherein the tubular portion of said head is a circumferentially complete member.

3. The hose clip of claim 1, wherein the tubular portion of said head has a free end and the outer diameter of said tubular portion decreases in a direction toward said free end thereof.

4. The hose clip of claim 1, wherein said tubular portion is integral with said shank.

5. The hose clip of claim 1, wherein said tubular portion constitutes a separable component of said tensioning element.

6. The hose clip of claim 1, wherein said head further comprises a second portion and said tubular portion is bonded to the second portion of said head.

7. The hose clip of claim 6, wherein said tubular portion is welded to said second portion of said head.

8. The hose clip of claim 1, wherein end portion of said tubular section of said housing has an arcuate shape.

9. The hose clip of claim 8, wherein said end portion of said tubular section forms part of a cylinder.

10. The hose clip of claim 1, wherein said tubular section of said housing includes a portion which is remote from said end portion of said band and said portion of said tubular section has a slot extending in substantial parallelism with the axis of said shank.

11. The hose clip of claim 10, wherein said slot has a first and a second end portion and divides said portion of said tubular section of said housing into first and second parts, and further comprising means for connecting said parts to each other in the region of at least one end portion of said slot.

12. The hose clip of claim 11, wherein said one end portion of said slot is remote from said head.

13. The hose clip of claim 12, wherein said connecting means comprises a second tubular portion which surrounds said tubular section in the region of said one end portion of said slot.

14. The hose clip of claim 13, wherein said connecting means is a washer which is secured to said shank and has a peripheral portion constituting said second tubular portion.

15. The hose clip of claim 14, wherein said shank includes means for holding said washer against axial movement relative to said tensioning element.

16. The hose clip of claim 11, wherein first and second parts are welded to each other in the region of said one end portion of said slot.

17. The hose clip of claim 1, wherein said tubular section of said housing includes a portion which is remote from said end portion of said band and said portion of said tubular section is provided with reinforcing means.

18. The hose clip of claim 17, wherein said reinforcing means includes at least one elongated stiffening rib which is substantially parallel to the axis of said shank.

19. The hose clip of claim 18, wherein said portion of said section has a slot which halves said rib.

20. The hose clip of claim 19, wherein said rib includes an outwardly bent part of said portion of said tubular section.

21. The hose clip of claim 1, wherein said end portion of said tubular section has a first surface and said head has a second surface adjacent to said first surface, at least one of said surfaces having a set of teeth engaging the other of said surfaces.

22. The hose clip of claim 21, wherein said teeth are substantially parallel to the axis of said tensioning element.

23. The hose clip of claim 21, wherein said teeth extend substantially radially of the axis of said tensioning element.

24. The hose clip of claim 21, wherein only one of said surfaces has teeth.

25. The hose clip of claim 21, wherein each of said surfaces has a set of teeth and the teeth of said first surface mate with the teeth of said second surface when said tensioning element does not rotate with respect to said tubular section.

26. The hose clip of claim 21, wherein said one surface is substantially cylindrical and coaxial with said shank.

27. The hose clip of claim 21, wherein said one surface is located in a plane which is substantially normal to the axis of said shank.

28. The hose clip of claim 21, wherein each of said teeth has two mirror symmetrical halves.

29. The hose clip of claim 21, wherein at least some of said teeth are non-symmetrical.

30. The hose clip of claim 29, wherein each of said non-symmetrical teeth has a flank which is substantially radial with respect to the axis of said tensioning element and a second flank which makes an acute angle with that direction in which said element must be rotated to tension said band.

31. The hose clip of claim 29, wherein each of said non-symmetrical teeth has a sawtooth profile.

32. The hose clip of claim 1, wherein said end portion of said tubular section is a portion of a cylinder and said tubular section has a second end portion, said shank comprising a portion which abuts against said second end portion of said tubular section.

33. The hose clip of claim 32, wherein said portion of said shank is a flange.

34. The hose clip of claim 32, wherein said tubular section constitutes said housing.

35. The hose clip of claim 1, wherein said housing further comprises a lateral extension.

36. The hose clip of claim 35, wherein said tubular section includes a bottom wall and said bottom wall includes a part constituting a component of said extension.

37. The hose clip of claim 36, wherein said tubular section further includes a side wall and said extension comprises a second component which is integral with said side wall and is substantially parallel to said first mentioned component.

38. The hose clip of claim 37, wherein said second component and said side wall make an angle of less than 180 degrees.

39. The hose clip of claim 35, wherein said extension is hollow and parts of said portions of said band extend into the interior of said hollow extension.

40. The hose clip of claim 39, wherein said extension comprises two spaced apart substantially parallel plate-like components and the distance between said components approximates the combined thickness of said portions of said band.

41. The hose clip of claim 40, wherein said components of said extension have end portions which are substantially coplanar and further comprising means for connecting said end portions of said components to each other.

42. The hose clip of claim 41, wherein said end portions of said components are welded to each other.

43. The hose clip of claim 35, wherein the width of said extension, as measured substantially radially of said shank, at least matches the diameter of said shank.

* * * * *